Patented Nov. 14, 1944

2,362,876

UNITED STATES PATENT OFFICE 2,362,876

COATING COMPOSITION AND PROCESS FOR PREPARING THE SAME

Ladislaus Balassa, Flint, Mich., assignor to E. I. du Pont de Nemours & Company, Wilmington, Del., a corporation of Delaware No Drawing. Application May 2, 1942, Serial No. 441,547

3 Claims. (Cl. 106—172)

This invention relates to the use of certain precipitated materials in the form of curds to prevent the hard caking of pigments in paint compositions and more particularly to the preparation of the curds as an integral part of the paint manufacture.

Heretofore metallic soaps, such as aluminum naphthenate, lead linoleate, and the like were added to paint to increase its viscosity. The disadvantages connected with such use of metallic soaps are instability on storage, tendency for the pigment to settle in the form of a hard cake, increased flow resulting in sagging on application, lower flexibility of the dried films and the occupational hazard due to the toxicity of lead and copper soaps.

In order to improve settling properties, it has been customary to add special pigments, such as talc or asbestine which have a tendency to flocculate the rest of the pigment. Frequently special anti-settling agents are employed, such as long chain organic acids, e. g. stearic acid; sulphonated oils, e. g. Turkey red oil; phosphatides, e. g. lecithin; and hydrophillic compounds, such as glycerine. Each of these materials have a distinct disadvantage. In the case of talc and asbestine when added to products in which they are not required, they frequently change the film characteristics to a notable degree. Organic acids are effective only under very limited circumstances and cannot be used with reactive pigments, such as zinc oxide. Sulphonated oils and lecithin slow up the drying of the film and lower its moisture resistance which results in lower outdoor durability. Water and highly hydrophillic compounds are effective only with a very limited number of products and even in compositions where their effects are otherwise satisfactory they frequently produce unsatisfactory water resistance with corresponding decrease in outdoor durability.

This invention therefore has as an object the production of paint compositions in which the pigments form soft sediments on prolonged standing which can be readily re-dispersed by simple hand stirring or shaking.

A further object is to produce paint with a controlled degree of thixotropy.

A further object is the control of the ratio of solids to viscosity of the finished paint independently from the viscosity of the vehicle.

A still further object is the provision of a paint which yields flexible undercoats of relatively low ratios of pigment to binder and which have superior resistance to lifting under enamel or lacquer topcoats.

Other objects will appear as the description of the invention proceeds.

These objects are accomplished by incorporating and evenly dispersing a curd in paint compositions as will be disclosed more in detail hereinafter. The curd is prepared by adding a solution of ethyl cellulose or other suitable cellulose derivative to a paint composition with which it is incompatible. The ethyl cellulose is then precipitated in the form of a soft flocculent curd and is evenly dispersed throughout the paint. This dispersed semi-solid curd acts in the nature of an auxiliary pigment and brings about a desirable state of flocculation of the main pigment in the paint and also results in increased body and resistance against lifting. The curd does not act as a binder. The curd should be present in relatively small amounts, preferably not less than 0.1% of the solids present in the composition. More than 4% of the curd does not offer any advantage, therefore the preferred percentage of the cellulose derivative curd lies in the range of about 0.1% to 4% of the enamel solids.

In practicing my invention I first dissolve ethyl cellulose in a suitable solvent, such as xylol or a blend of xylol and high solvency petroleum naphtha and if necessary add an alcohol, such as butyl alcohol, if the type of ethyl cellulose used does not otherwise yield a satisfactory solution. I then introduce the ethyl cellulose solution into a clean ball or pebble mill containing only the usual amount of balls or pebbles. I then close the mill and allow it to turn until the ethyl cellulose solution wets the balls and mill shell evenly whereupon the rest of the paint mill base is added and the composition is then ground until satisfactory dispersion of the pigments and precipitated ethyl cellulose takes place.

The following examples of typical compositions are given by way of illustration and not as a limitation:

*Example I*

| Dipping primer | Parts by weight |
|---|---|
| Ethyl cellulose solution | 2.0 |
| High solvency petroleum naphtha | 2.0 |
| Varnish "A" | 43.5 |
| Iron naphthenate | .5 |
| Finely ground barytes | 37.0 |
| Carbon black | 4.0 |
| Mineral spirits | 11.0 |
| | 100.0 |

Varnish "A" was formed from the following ingredients using the proportions indicated:

|  | Parts by weight |
| --- | --- |
| Resin [1] | 18.00 |
| Calcium hydrate | .72 |
| Linseed oil | 42.28 |
| Mineral spirits | 39.00 |
|  | 100.00 |

[1] The resin used in this example may be damar, ester gum, East Indian gum, copals, rosin, or any natural semi-synthetic or synthetic resin commonly used in varnishes.

*Example II*

| White primer surfacer | Parts by weight |
| --- | --- |
| Ethyl cellulose solution | 6.15 |
| High solvency petroleum naphtha | 6.05 |
| Alkyd resin "B" solution | 37.60 |
| Calcined pyrophyllite | 38.85 |
| Basic calcium silicate | 4.50 |
| Titanium dioxide | 5.85 |
| V. M. and P. naphtha | .40 |
| Lead naphthenate solution (16% Pb) | .30 |
| Manganese naphthenate solution (3% Mn) | .30 |

The ethyl cellulose solution used in Examples I and II was prepared from the following ingredients using the proportions indicated:

|  | Parts by weight |
| --- | --- |
| Ethyl cellulose | 10.0 |
| Xylol | 70.0 |
| High solvency petroleum naphtha | 20.0 |
|  | 100.0 |

Alkyd resin "B" solution used in Example II was prepared from the following ingredients using the proportions indicated:

|  | Parts by weight |
| --- | --- |
| Phthalic anhydride | 19.99 |
| Glycerol | 8.72 |
| Litharge | .03 |
| Linseed oil | 28.74 |
| High solvency petroleum naphtha | 42.52 |
|  | 100.00 |

The oil modified alkyd resin referred to above, may be made in any well-known manner as, for example, by heating the ingredients at any suitable temperature above the melting point of the materials until resinification is complete. If desired, refluxing or partial refluxing may be resorted to or the operation may be carried out at elevated or reduced pressures.

The calcined pyrophyllite used in Example II was prepared by calcining pyrophyllite in a rotary calciner for about two hours at between 100 and 1200° C.

The basic calcium silicate used in Example II was prepared by calcining a finely ground blend of 1 mol silica and 1½ mol hydrated calcium oxide in a rotary calciner at between 1150° C. and 1260° C. until calcium silicate is obtained containing less than .8% of free uncombined CaO.

The ethyl cellulose solution was of a hydrocarbon soluble type having an ethoxy content of between 46.8 and 48.5%.

The coating compositions set forth above, as well as other coating compositions falling within the scope of the present invention, are preferably prepared in ball or pebble mills by first adding ethyl cellulose solution and an about equal quantity of high solvency petroleum naphtha. The mill is then closed and allowed to turn for a few minutes in order to wet the balls and the mill shell with the diluted resin solution. The batches are then loaded into the mills, dispersed and ground in the manner customary for paint compositions; after dispersion, the paints are reduced to application consistency with additional solvent. The driers may be added at any desired point in the preparation of the coating compositions.

Where desired, extenders or prime pigments such as silica, whiting, lead chromate, zinc chromate, white lead, etc., may be incorporated in the coating compositions falling within the scope of the present invention.

The use of zinc oxides, litharge, red lead, calcium aluminates or other basic pigments in combination with dispersed resin curds falls within the scope of this invention.

Varnish "A" referred to above, or other oleoresinous vehicles of the same type, may be made by any manner known to the art, for example, by heating the ingredients at any suitable temperature above the melting point of the ingredients until a homogeneous product of the desired dry and physical properties is obtained.

The term "curd" is used herein to denote curd-like resin precipitates which are obtained in a soft crumbly form when the ethyl cellulose solutions are mixed or brought in contact with liquids or compositions with which they are incompatible.

I prefer to use with my invention a 10% to 20% solution of an ethyl cellulose in xylol or toluol or in a combintion of either with a high solvency petroleum naphtha. I found ethyl cellulose having an ethoxy content between 46.8% and 50% to be most suitable for the purpose of this invention. However, ethyl cellulose with an ethoxy content as low as 43.5% will function properly if used in suitable solvent combinations. While I have illustrated the invention by the use of ethyl cellulose, other water insoluble film-forming derivatives of cellulose may be used provided they are precipitated from the paint vehicle in the form of soft flocculent curds. Such derivatives include ¼ second (Hercules) nitrocellulose, nitrogen content 11.85–12.20%; cellulose acetate—lacquer grade; acetic acid content 54.0–55.0%; cellulose acetobutyrate, low viscosity grade, i. e. 30–50 centipoises in 10% solution in acetone, and benzyl cellulose.

In general, compounds capable of forming readily dispersible curds, when added to paint or enamel compositions with which they are incompatible, function properly and are within the scope of this invention. On the other hand, compounds such as rubber, some commercial grades of polyvinyl formal, polyvinyl butyral, and certain types of cellulose acetobutyrate which cannot be precipitated to form suitable flocculent curds, will not serve the purpose of this invention.

While I prefer to prepare the curd by introducing a solution of the ethyl cellulose into a ball mill, wetting the balls and mill shell with same, then following it with the rest of the ingredients of the paint composition, preparing the curd in other manners, as for instance, by introducing the curd forming material at other stages of the preparation of the paint is within the scope of this invention. The use of mills, grinding or dispersing devices other than ball mills for the grinding of the paint or for the dispersion of the resinous curd is also within the scope of the invention.

The advantages of the present invention are summarized as follows:

Through suitable adjustments in the amount of the curd dispersed in paint compositions, it is possible to control within a wide range, the viscosity and the thixotropy of said compositions as well as their flowing and levelling properties without the necessity of changing any other factor like viscosity of binder, total solid content, pigment to binder ratio, etc.

Relatively small quantities of the dispersed curd prevent the formation of hard pigment sediments, even after prolonged storage, without slowing up the dry or lowering the water resistance and outdoor durability of the paints.

With compositions containing reactive ingredients, it is possible to choose the type of curd-forming material which is neutral to, i. e., not reactive with, the reactive ingredients, and thereby will not affect the stability or durability of the resulting compositions.

The well-dispersed curd suppresses to a very considerable extent the "lifting" tendency of the compositions under the influence of rich solvents. This effect is particularly important in the case of undercoats which are used under topcoats like nitrocellulose lacquers or alkyd enamels which contain rich solvents. I have found, for instance, that the lifting range of a composition containing as low as .6% of a well-dispersed ethyl cellulose curd was lowered by 75 weight units, to the pigment to binder ratio of 275/100, below the point necessary to obtain freedom from lifting without the use of ethyl cellulose. The lowered pigment to binder ratio possible with ethyl cellulose results in tougher, more flexible and more durable films than is the case at the higher ranges of pigment to binder ratios.

Previous to the present invention, if a paint with increased viscosity was sought, it was necessary to use a binder with a very much higher body or one had to effect a radical change in the pigment combination or even increase the pigment to binder ratio. Such changes, as a rule, resulted in paint films having a weakened physical structure and lower resistance against weathering.

It is apparent that many widely different embodiments of this invention may be made without departing from the spirit and scope thereof, and therefore, it is not intended to be limited except as indicated in the appended claims.

I claim:

1. The process of preparing paints, enamels and the like containing a pigment which forms a soft, readily redispersible sediment on standing which comprises mixing a solution of ethyl cellulose having an ethoxy content between about 43.5 and 50% with a coating composition containing a pigment, an oleoresinous film-forming agent and an organic solvent in which the said film-forming agent is dispersible but with which the said ethyl cellulose is incompatible thereby causing the said ethyl cellulose to be precipitated in situ in the form of a flocculent curd, said curd being present in amount between about .1 and 4% of the solids present.

2. The process of claim 1 in which the ethyl cellulose solution contains from 10 to 20 per cent of ethyl cellulose.

3. A coating composition comprising an oleoresinous film-forming agent dispersed in organic solvents, a pigment, and from about .1 to 4% on a solid basis of readily dispersible flocculent curds of ethyl cellulose having an ethoxy content of from 43.5 to 50% precipitated in the said vehicle and being incompatible therewith.

LADISLAUS BALASSA.